United States Patent
Isakson

(10) Patent No.: US 8,850,955 B2
(45) Date of Patent: Oct. 7, 2014

(54) PEDAL ROD RETAINING ASSEMBLY FOR A HYDRAULIC BRAKE SYSTEM

(75) Inventor: Larry E. Isakson, Granger, IN (US)

(73) Assignee: Robert Bosch GmbH, Stuttgart, DE (US)

( * ) Notice: Subject to any disclaimer, the term of this patent is extended or adjusted under 35 U.S.C. 154(b) by 1116 days.

(21) Appl. No.: 12/821,368

(22) Filed: Jun. 23, 2010

(65) Prior Publication Data

US 2011/0315008 A1    Dec. 29, 2011

(51) Int. Cl.
  *F16J 1/14*   (2006.01)
  *B60T 11/18*   (2006.01)
  *F16C 11/06*   (2006.01)

(52) U.S. Cl.
  CPC .............. *B60T 11/18* (2013.01); *F16C 11/0638* (2013.01)
  USPC .............................................. 92/187; 92/188

(58) Field of Classification Search
  USPC ................................................... 92/187–188
  See application file for complete search history.

(56) References Cited

U.S. PATENT DOCUMENTS

| | | | |
|---|---|---|---|
| 3,222,999 A * | 12/1965 | Hager | 91/434 |
| 4,318,627 A * | 3/1982 | Morin | 403/133 |
| 4,650,363 A | 3/1987 | Kehl et al. | |
| 4,831,916 A | 5/1989 | Leigh-Monstevens et al. | |
| 5,153,976 A | 10/1992 | Benchaar et al. | |
| 5,335,585 A * | 8/1994 | Fischenich et al. | 92/128 |
| 5,499,570 A * | 3/1996 | Bergelin et al. | 92/84 |
| 5,794,512 A * | 8/1998 | Prosch et al. | 92/128 |
| 6,470,791 B1 | 10/2002 | Welter et al. | |
| 6,758,622 B2 * | 7/2004 | Burton | 403/7 |
| 6,810,787 B2 | 11/2004 | Welter et al. | |
| 7,037,022 B2 * | 5/2006 | Schonhoff et al. | 403/114 |

FOREIGN PATENT DOCUMENTS

| | | |
|---|---|---|
| EP | 0896162 A1 | 2/1999 |
| FR | 2828533 A1 | 2/2003 |
| WO | 2007115524 A2 | 10/2007 |

OTHER PUBLICATIONS

International Search Report and Written Opinion in corresponding PCT application (i.e., PCT/US2011/040672), mailed Nov. 9, 2011 (10 pages).

* cited by examiner

*Primary Examiner* — Charles Freay
*Assistant Examiner* — Christopher Bobish
(74) *Attorney, Agent, or Firm* — Maginot, Moore & Beck

(57) ABSTRACT

A braking system includes a brake booster with a power piston assembly structure defining a guide bore which possesses an open end, the guide bore defining a bore axis. A pivot structure is positioned in the guide bore and including (i) a body having an interior surface that defines a cavity, and (ii) a plurality of extensions protruding inwardly from the interior surface. A pedal rod includes (i) a ball-shaped distal end portion is retained in the cavity by the plurality of extension members, and (ii) a shaft extending from the ball-shaped distal end portion. A retainer is secured to the power piston assembly structure so as to prevent advancement of the pivot structure through the open end of the power piston assembly structure. The retainer defines a frusto-conical passageway through which the shaft extends enabling the shaft to pivot.

17 Claims, 5 Drawing Sheets

PEDAL ROD RETAINING ASSEMBLY FOR A HYDRAULIC BRAKE SYSTEM

FIELD OF THE INVENTION

The present disclosure generally relates to hydraulic brake systems, and in particular to pedal rods used with such hydraulic brake systems.

BACKGROUND OF RELATED ART

With reference to FIG. 1, a hydraulic brake actuating system 10 used in automotive vehicles typically includes a master cylinder 14 defining a cylinder bore 15 in which a primary piston 16 is translatably positioned. Ports in the cylinder bore fluidly connect the master cylinder 14 to hydraulic lines (not shown) of the vehicle's brake foundation system. The cylinder bore and the hydraulic lines are supplied with hydraulic brake fluid from one or more brake fluid reservoirs (not shown) fluidly coupled to the master cylinder 14. As is known in the art, the axial movement of the primary piston in the cylinder bore against the brake fluid in the master cylinder causes a pressure increase that is transmitted from the master cylinder through the brake lines to brake calipers or wheel cylinders at the wheels of the vehicle. The brake calipers or wheel cylinders are configured to urge brake pads against braking surfaces, i.e., drums, rotors, etc., of the wheel assemblies with a magnitude of force that corresponds to the position of the piston in the cylinder bore of the master cylinder 14.

A brake pedal 22 is used to control the movement of the piston assembly in the cylinder bore. In most hydraulic brake systems, a brake booster, such as brake booster 18, is coupled between the brake pedal and the master cylinder to translate the force applied to the brake pedal by the driver to an amplified force which is in turn applied to the primary piston of the master cylinder. As depicted in FIG. 1, a brake booster 18 typically comprises a booster housing 20 defining a bore 24 in which a power piston assembly 28 is translatably disposed. The power piston assembly 28 includes an input shaft 30 arranged in an input bore portion 25 of the power piston assembly 28, and an actuator pin 23 that extends axially from the input shaft 30 into a guide bore portion 32 of the power piston assembly 28. The brake booster 18 also includes a pedal rod 34 having a distal end 40 located in the guide bore portion 32 adjacent to the actuator pin 23 and a proximal end 31 coupled to the brake pedal 22. The distal end of the pedal rod 34 is approximately axially aligned with the guide bore 32. When the brake pedal 22 is pressed, the distal end of the pedal rod 34 is moved axially toward and into contact with a socket 36 at the end of the guide bore 32 that facilitates axial alignment between the distal end of the pedal rod 34 and the actuator pin 23.

The booster housing 20 includes an inlet port 35 through which a fluid (other than the brake fluid) is introduced into the housing 20, and an outlet port 37 through which the fluid is allowed to escape the housing 20. A normally open valve 38, also referred to as a throttle valve, is located within the power piston assembly 28 and between the inlet 35 and outlet ports 37 of the booster housing 20. During operation, the fluid enters the booster housing 20 via the inlet port 35, flows through the throttle valve 38 of the power piston assembly 28, and exits the housing 20 via the outlet port 37. To actuate the brakes, a force is applied to the brake pedal 22 by the driver that moves the distal end of the pedal rod 34 axially in the bore 32 which in turn causes the actuator pin 23 to move the input shaft 30 axially in the input bore 25. This movement closes the throttle valve 38 changing the degree of restriction of the flow of fluid through the housing 20. An increase in flow restriction results in a pressure increase on the input side of the power piston 28, pushing the power piston 28 toward the master cylinder primary piston resulting in an amplified force being applied to the master cylinder primary piston to actuate the brakes.

One difficulty faced in the operation of a hydraulic brake system as described above is retaining the distal end of the pedal rod within the interior walls of the guide bore 32. In previously known hydraulic brake systems, the distal end portion 40 of the pedal rod 34 has a hemispherical shape. A rubber grommet 44 is positioned around the shaft 29 of the pedal rod 34 adjacent to the distal end portion 40 to serve as a retaining collar that is configured to retain the hemispherical distal end of the pedal rod 34 in the guide bore 32. The outside diameter of the rubber grommet 44 resides in a cylindrical recess, which enables the grommet to move axially and also prevents the grommet 44 and pedal rod 34 from being pulled out of the power piston assembly 28. While effective, over time, the properties of the rubber material of the grommet, such as the hardness and/or elasticity, may change in a manner that adversely affects the ability of the grommet to retain the pedal rod in the guide bore 32.

In addition, during use, the pedal rod 34 is allowed some limited pivotal movement with respect to the axis of the guide bore 32. Using a rubber grommet to retain the distal end portion 40 of the pedal rod in the guide bore 32 as described above results in a change in the pivot axis of the rod as the rod is moved axially from a brakes released position to a brakes fully applied position. In the released position, the rubber grommet approximately centers the pedal rod on the axis of the guide bore, and pivoting occurs approximately about the center of the grommet. As the pedal rod travels towards the fully applied position, the hemispherical end of the pedal rod is forced into the mating hemispherical socket which brings the hemispherical end nearer to the center line of the actuator pin 23. Pivoting then occurs very close to the center of the hemisphere. Such variation in pivot location, and the friction resulting from forcing the hemispherical end into the mating socket introduces inconsistencies into the performance of the brake booster.

SUMMARY

In accordance with one embodiment of the present disclosure, a braking system includes a brake booster having a power piston assembly structure defining a guide bore which possesses an open end, the guide bore defining a bore axis. A pivot structure is positioned in the guide bore and including (i) a body having an interior surface that defines a cavity, and (ii) a plurality of extensions protruding inwardly from the interior surface. A pedal rod includes (i) a ball-shaped distal end portion which is retained in the cavity by the plurality of extension members, and (ii) a shaft extending from the ball-shaped distal end portion. An outer retainer is secured to the power piston assembly structure so as to prevent advancement of the pivot structure through the open end of the power piston assembly structure. The retainer defines a passageway through which the shaft extends.

In accordance with another embodiment of the present disclosure, a method of assembling a pedal rod retainer assembly is provided. The method includes attaching a pivot structure to a ball-shaped end of a pedal rod in a snap fit manner such that the ball-shaped end is retained in a cavity defined by an interior surface of the pivot structure while permitting pivotal movement of the ball-shaped end with respect to the pivot structure. After attaching the pivot structure to the ball-shaped end of the pedal rod, the pivot structure is inserted, with the ball-shaped end retained therein, into a guide bore defined by an interior surface of a portion of a power piston assembly. The guide bore defines a bore axis having an axial length that is greater than an axial length of the pivot structure to permit translational movement of the pivot structure in the guide bore along the bore axis.

BRIEF DESCRIPTION OF THE FIGURES

Features of the present invention will become apparent to those of ordinary skill in the art to which this device pertains from the following description with reference to the figures, in which.

DETAILED DESCRIPTION

For the purpose of promoting an understanding of the principles of the device described herein, reference will now be made to the embodiment(s) illustrated in the figures and described in the following written specification. It is understood that no limitation to the scope of the device is thereby intended. It is further understood that the device includes any alterations and modifications to the illustrated embodiment(s) and includes further applications of the principles of the device as would normally occur to one of ordinary skill in the art to which this device pertains.

Figure 1:
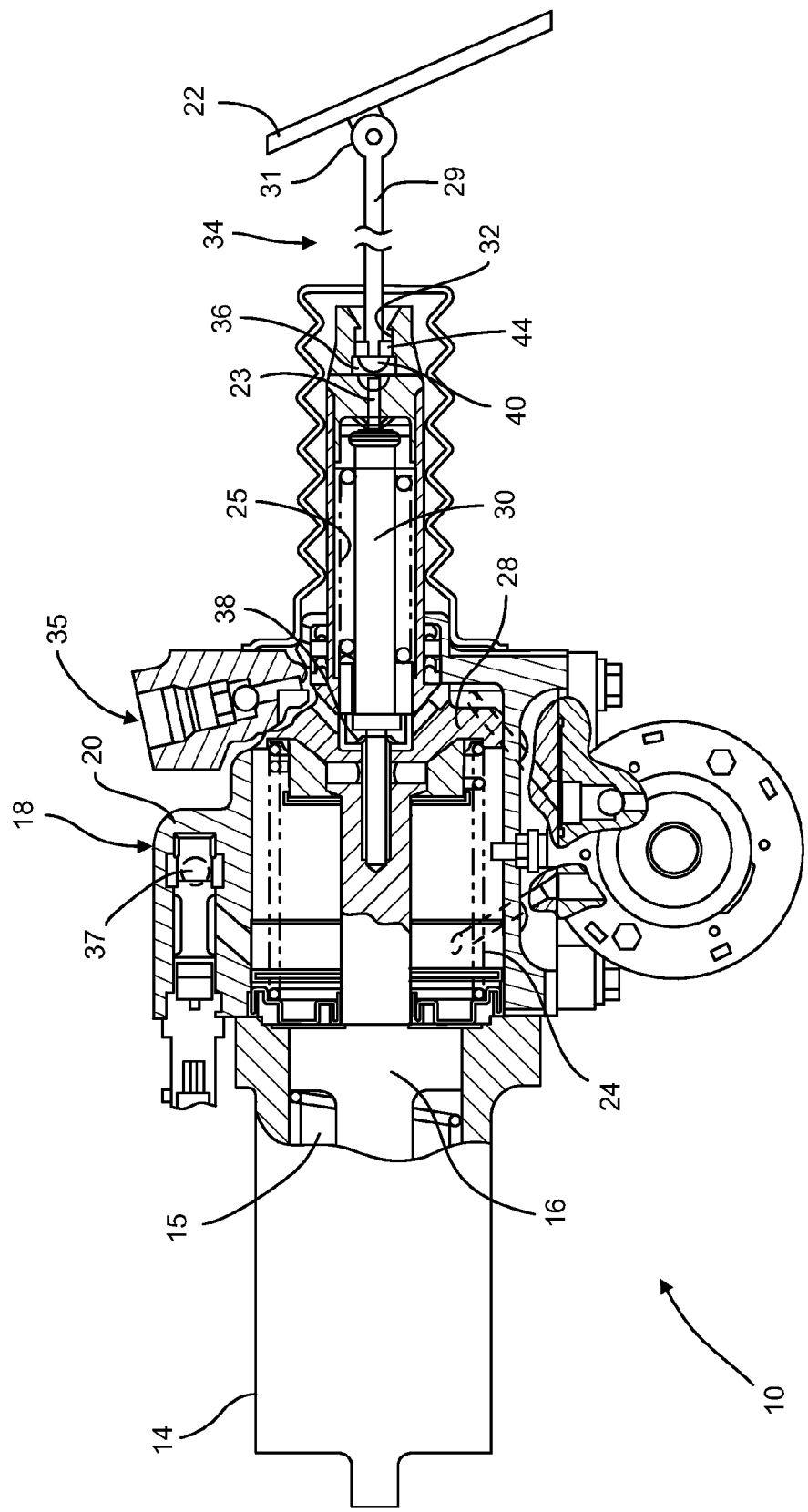
FIG. 1 is a side view of a prior art hydraulic brake system that includes a master cylinder and a hydraulic brake booster with the hydraulic brake booster shown in cross-section.
Figure 2:
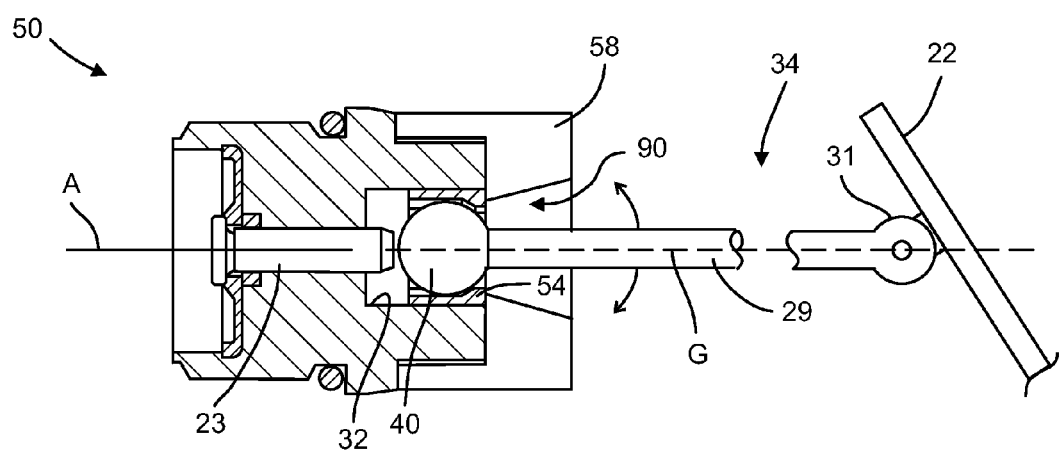
FIG. 2 is a cross-sectional view of a brake booster pedal rod retainer assembly according to an embodiment of the disclosure.
Figure 3:
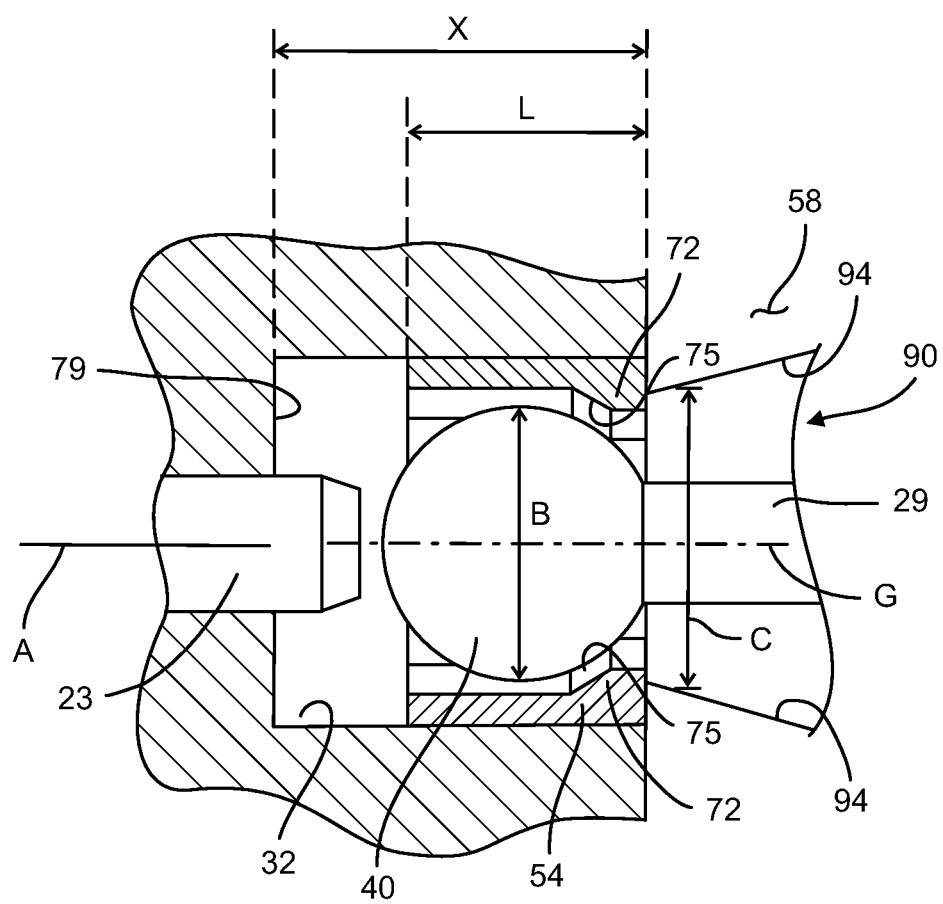
FIG. 3 is an enlarged view of the brake booster pedal rod retainer assembly of FIG. 2.

Referring now to FIGS. 2 and 3, an embodiment of a brake booster pedal rod retainer assembly 50 for securing the distal end portion 40 of a pedal rod 34 in relation to a guide bore 32 of a brake booster of a hydraulic brake system, and in particular, in relation to an actuator member, or pin, 23, is shown. As depicted, the retainer assembly 50 comprises a pedal rod 34, a pivot structure 54, and an outer retainer 58. The pedal rod 34 includes a shaft 29 having a proximal end portion 31 coupled in a suitable manner to a brake pedal 22. The distal end portion 40 of the pedal rod 34 is ball-shaped or spherically shaped. As used herein, the terms "distal" and "proximal" used in reference to the pedal rod refer to positions with respect to an operator of the vehicle. The ball-shaped end portion 40 of the pedal rod 34 is rotatably and pivotably received in a socket 73 defined by the pivot structure 54. As explained below, when received in the guide bore, the socket 73 defined by the pivot structure enables translational movement of the ball-shaped end portion 40 in the guide bore 32 while retaining the ball-shaped end portion 40 of the pedal rod 34 centered on the axis A defined by the guide bore 32 and the actuator pin 23.

Figure 4:
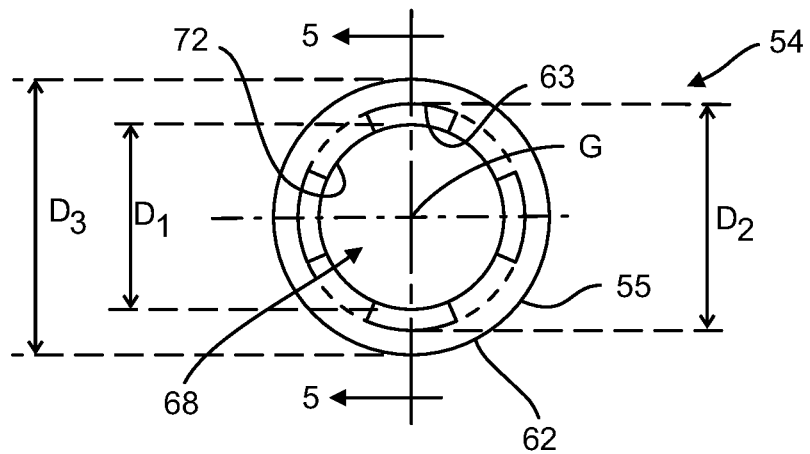
FIG. 4 is an end view of the sliding socket of the brake booster pedal rod retainer.
Figure 5:
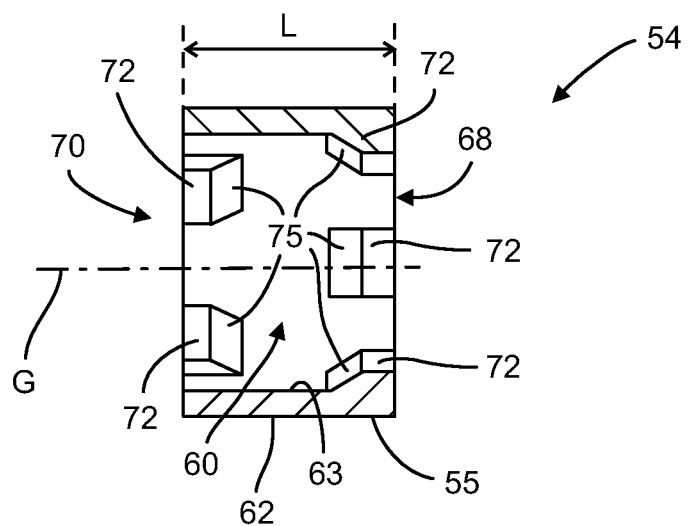
FIG. 5 is a cross-sectional view of the sliding socket taken along lines 5-5 of FIG. 4.

As depicted in FIGS. 4 and 5, the pivot structure 54 comprises a hollow, cylindrically shaped body 55 having an opening 68, 70 at each end connected by a cavity 60 defined at least in part by inner surface 63. In the embodiment of FIGS. 2-8, the opening 68 is configured to serve as an insertion opening through which the ball-shaped end portion 40 of the pedal rod 34 is inserted into the cavity 60. In alternative embodiments, either end or both of the ends 68, 70 of the pivot structure 54 may be used for the insertion opening and in some cases the ends may be used interchangeably as the insertion opening for the pivot structure 54. As best seen in FIG. 5, the pivot structure 54 includes a plurality of extensions, standoffs, tabs, or the like 72 (referred to hereafter as extensions) integrally formed with the pivot structure and arranged near the openings 68, 70. The extensions 72 project into the cavity 60 and include contact portions or segments 75 for contacting the ball-shaped end portion 40 of the pedal rod 34. The contact segments 75 cooperate to define a socket within the cavity 60 that retains the ball-shaped end 40 within the cavity 60 of the pivot structure 54 while permitting the ball-shaped end portion 40 to pivot with respect to the pivot structure 54.

As depicted in FIG. 4, the inner surface 63 of the pivot structure defines a diameter D2 perpendicular to the axis G of the pivot structure that is greater than the diameter B of the ball-shaped end portion 40 (FIG. 3). The extensions 72 cause the openings 68, 70 (opening 70 not visible in FIG. 4) to have an effective diameter D1 that is less than the diameter D2 and less than the diameter B of the ball-shaped end portion 40. To enable insertion of the ball-shaped end portion 40 through the opening 68 and into the socket defined by the contact segments 75, the pivot structure 54 is formed of a resilient, flexible material, such as molded plastic. With the pivot structure 54 and the pedal rod 34 removed from the guide bore 32, the resilient, flexible material of the pivot structure is deformable to permit the diameter B of the ball-shaped end portion to pass through the opening 68 defined in part by the extensions 72 and into the area of the cavity 60 having the diameter D2. Once the ball-shaped end portion 40 has passed through the opening 68, the pivot structure 54, and in particular the opening 68, returns to its original shape. In one particular embodiment, the pivot structure 54 is formed of a molded plastic material that is flexible enough to allow the pivot structure 54 to be snap fit to the ball-shaped end portion 40 and that is sufficiently strong to not shear or break when the pedal rod is subjected to a tensile force in the vicinity of, as an example, 1000 pounds.

As the pivot structure returns to its original shape, the contact segments 75 return to their original positions and form the socket for the ball-shaped end portion 40. The socket defined by the contact segments 75 is slightly larger than the ball-shaped end portion 40 when the pivot structure is positioned guide bore 32 to permit rotational and pivotal movement of the pedal rod with respect to the pivot structure 54. Referring again to FIG. 4, the pivot structure 54 has a uniformly shaped outer surface 62 that defines an outer diameter D3. The guide bore 32 is shaped complementarily to outer surface 62 and has a diameter that is slightly larger than the outer diameter D3 to permit the pivot structure 54 to be slidably inserted into the guide bore 32 of the brake booster. When inserted into the guide bore 32 with the ball-shaped end portion 40 positioned in the socket defined by the contact segments 75, the guide bore 32 prevents the deformation of the pivot structure 54 thus maintaining the positions of the extensions 72 and corresponding contact segments 75 so that the ball-shaped end of the pedal rod is retained within the socket 73 when inserted into the guide bore 32.

When inserted into the guide bore, the axis G of the pivot structure 54 is aligned with the axis A defined by the actuator pin 23 and the guide bore 32. Referring to FIG. 3, the guide bore 32 has an axial length X that corresponds to the distance from the opening into the guide bore 32 to the bottom surface 79 of the bore. The actuator pin 23 extends from the input shaft 30 into the guide bore 32 through a passageway defined in the bottom surface 79. The axial length X of the guide bore 32 is greater than the corresponding axial length L of the pivot structure 54 which permits the pivot structure 54 to be translated in the bore 32 in conjunction with the ball-shaped end portion 40 of the pedal rod 34 to move the actuator pin 23 axially toward the input shaft 30. The pivot structure 54 is configured to maintain the ball-shaped end portion 40 of the pedal rod 34 centered on the axis A of the actuator pin 23 and the guide bore 32 as the ball-shaped end portion 40 of the pedal rod is translated in the guide bore by the brake pedal. In addition, the pivot structure 54 is not secured to the interior surfaces of the guide bore 32 and therefore is capable of rotating independently of both the bore 32 and the ball-shaped end portion 40 of the pedal rod.

Once the pivot structure 54 and the ball-shaped end portion 40 are suitably received in the guide bore 32 of the brake booster, an outer retainer 58 is placed over the end of the guide bore 32 and secured to the housing over the guide bore to prevent the pivot structure 54 and the ball-shaped end portion 40 of the pedal rod from escaping the guide bore. In the embodiment of FIGS. 3-8, the outer retainer 58 includes an opening, or passageway, 90 through which the shaft 29 of the pedal rod 34 extends from the guide bore 32 toward the brake pedal 22. The passageway 90 is generally frusto-conical in shape with the portion of the passageway facing the brake housing 20 having a width or diameter C that is greater than the diameter B of the ball-shaped end portion 40 to permit the ball-shaped end portion 40 to pass into the bore 32. The diameter C is less than the outer diameter D3 (FIG. 4) of the pivot structure 54 located in the guide bore 32 in order to retain the pivot structure 54 within the guide bore 32 when the outer retainer 58 is secured to the housing. The passageway widens in a direction toward the brake pedal 22 and defines angled inner walls 94 that permit pivotal movement of the pedal rod 34 with respect to the guide bore 32. In addition to retaining the ball-shaped end portion 40 centered on the axis A of the actuator pin 23 and guide bore 32 during translational movement of the pedal rod, the pivot structure 54 retains the ball-shaped end portion 40 centered on the axis A of the actuator pin 23 and the guide bore 32 as the pedal rod 34 is pivoted with respect to the axis A.

In the embodiment of FIGS. 2-8, the portion of the power piston assembly 28 that defines the guide bore 32 possesses a coupling component or structure 92 (FIG. 8), and the outer retainer 58 possesses a coupling component or structure 96 (FIGS. 6-8) that is configured complementarily with respect to the coupling component 92. The coupling components 92, 96 are configured to cooperate to secure the outer retainer to the portion of the power piston assembly 28 that defines the guide bore 32. In one embodiment, the coupling component 92 comprises an exterior threaded surface 92, and the coupling component 96 comprises an interior threaded surface 96 configured to mate or mesh with the exterior threaded surface 92.

Figure 6:
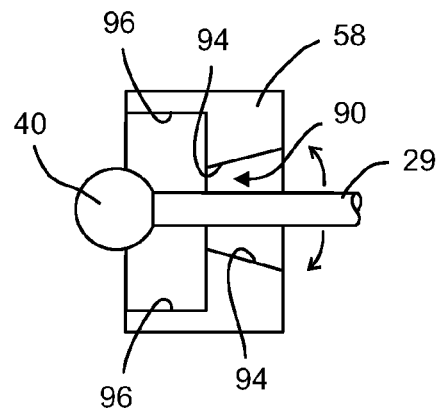
FIG. 6 is a cross-sectional view of the pedal rod and outer retainer of the brake booster pedal rod retainer assembly of FIG. 3 with the ball-shaped end of the pedal rod inserted through the outer retainer.
Figure 7:
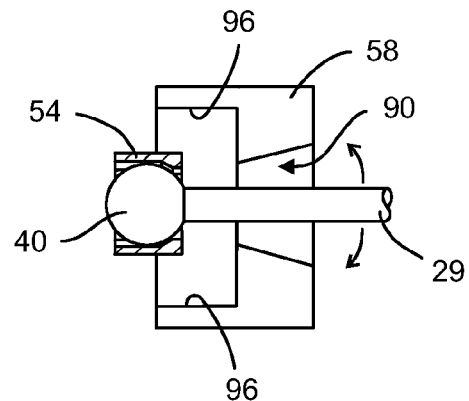
FIG. 7 is a side cross-sectional view of the sliding socket and pedal rod of FIG. 6 with the ball-shaped end of the pedal rod received in the sliding socket of the brake booster pedal rod retainer assembly of FIG. 3.
Figure 8:
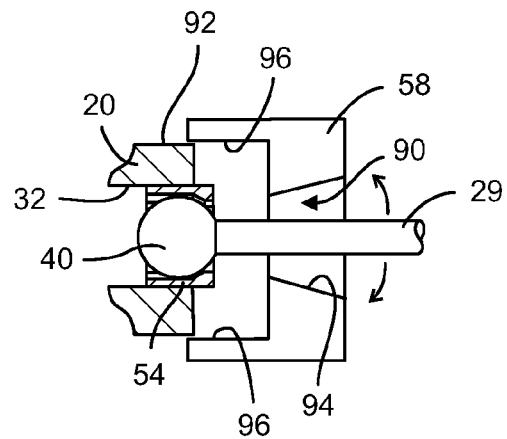
FIG. 8 is a cross-sectional view of the sliding socket, pedal rod, and outer retainer of FIG. 7 with the ball-shaped end of the pedal rod and sliding socket shown inserted into the guide bore of the power piston assembly.

A method of assembling the pedal rod retainer assembly is schematically depicted in FIGS. 6-8 (and 3). As seen in FIGS. 6 and 7, the distal end 40 of the pedal rod 34 is inserted through the opening 90 of the outer retainer 58 with the ball-shaped end portion 40 extending toward the guide bore as depicted in FIG. 6. The pivot structure 54 is then snapped onto the ball-shaped end portion 40 of the pedal rod 34 as shown in FIG. 7. More specifically, the ball-shaped end portion 40 is urged through the insertion opening of the pivot structure with enough force to deform the pivot structure 54 at the insertion opening to a degree that enables the ball-shaped end portion 40 to pass into the cavity defined in the interior of the pivot structure 54. Once the ball-shaped end portion 40 is received in the cavity of the pivot structure, the pivot structure 54 returns to its original shape to retain the ball-shaped end portion 40 in the cavity defined by the pivot structure 54 as shown in FIG. 7. The pedal rod 34 and pivot structure 54 are then inserted into the guide bore 32 of the brake booster with the ball-shaped end portion 40 positioned adjacent to the actuator pin 23 as shown in FIG. 8. The outer retainer 58 is then secured to the structure that defines the guide bore 32 by meshingly engaging the exterior threaded surface 92 with the interior threaded surface 96 of the outer retainer 58 to thereby secure the ball-shaped end portion 40 of the pedal rod in the socket defined in the pivot structure 54 and to retain the pivot structure 54 in the guide bore 32.

It will be appreciated that variants of the above-described features and functions, as well as other features and functions, or alternatives thereof, may be desirably combined into many other different systems or applications. Various presently unforeseen or unanticipated alternatives, modifications, variations or improvements therein may be subsequently made by those of ordinary skill in the art which are also intended to be encompassed by the following claims.

What is claimed is:

1. A braking system, comprising:
   a brake booster including a power piston assembly structure that defines a guide bore which possesses an open end, the guide bore defining a bore axis;
   a pivot structure positioned in the guide bore and including (i) a body having an interior surface that defines a cavity, and (ii) a plurality of extensions protruding inwardly from said interior surface;
   a pedal rod including (i) a ball-shaped distal end portion retained in said cavity by said plurality of extension members, wherein said ball-shaped end portion is positioned in contact with a contact segment of each of said plurality of extensions, and (ii) a shaft extending from said ball-shaped distal end portion; and
   a retainer secured to said brake booster so as to prevent advancement of said pivot structure through said open end of said power piston assembly structure, said retainer defining a passageway through which said shaft extends,
   wherein each of the plurality of extensions includes a side and a terminating end defining a contact segment, the contact segment of each of the extensions being positioned adjacent the ball-shaped distal end portion retained in the cavity,
   wherein the contact segments of the plurality of extensions are arranged to form a socket within the cavity in which the ball-shaped distal end portion is pivotally retained, and
   wherein the pivot structure is slidable in relation to the guide bore along the bore axis with the ball-shaped distal end portion retained therein.

2. The braking system of claim 1, wherein said plurality of extensions contact said ball-shaped distal end portion so as to space said ball shaped distal end portion away from said interior surface of said cavity.

3. The braking system of claim 1, wherein:
said guide bore extends for a first axial distance, and
said pivot structure extends for a second axial distance which is less than said first axial distance.

4. The braking system of claim 1, wherein:
said ball-shaped distal end portion is configured to move in relation to said power piston assembly structure along said bore axis, and
said ball-shaped distal end portion is configured to pivot in relation to said pivot structure.

5. The braking system of claim 1, wherein:
said power piston assembly structure includes a first coupling component having an exterior surface,
said retainer includes a second coupling component, the second coupling component including an interior surface, and
said exterior surface of said first coupling component is configured to mate with said interior surface of said second coupling component so as to secure said retainer to said power piston assembly structure.

6. The braking system of claim 1, wherein:
each of said plurality of extensions is configured to extend toward said ball-shaped distal end portion, said ball-shaped distal end portion defining a diameter perpendicular to said guide bore axis, wherein a first plurality of said contact segments is positioned in contact with said ball-shaped distal end portion on one side of said diameter and a second plurality of said contact segments is positioned in contact with said ball-shaped distal end portion on another side said diameter.

7. The braking system of claim 1, further comprising a brake pedal mechanically coupled to said shaft of said pedal rod.

8. The braking system of claim 1, wherein said passageway of said retainer possesses a frusto-conical shape.

9. The braking system of claim 8, wherein said passageway defines a first open end that faces said power piston assembly structure and a second open end opposite said first open end, said first open end has a width that is less than a width of said pivot structure.

10. The braking system of claim 9, said second open end has a width that is greater than said width of said first open end to permit pivotal movement of said pedal rod with respect to said guide bore.

11. The braking system of claim 1, wherein said ball-shaped distal end portion of said pedal rod is retained in said pivot structure in a snap-fit manner.

12. The braking system of claim 1, further comprising an actuator member extending into said guide bore and positioned in contact with said ball-shaped distal end portion of said pedal rod.

13. The braking system of claim 12, wherein movement of said ball-shaped distal end portion of said pedal rod along said bore axis causes movement of said actuator member along said bore axis.

14. The braking system of claim 13, wherein said ball-shaped distal end portion is pivotable in relation to said actuator member when said ball-shaped distal end portion is positioned in contact with said actuator member.

15. The braking system of claim 14, wherein:
said actuator member defines an axis that is aligned with said bore axis; and
said cavity of said pivot structure retains said ball-shaped end portion centered on said axis of said actuator member during axial and pivotal movement of said ball-shaped end portion.

16. The braking system of claim 1, the pivot structure being formed of a plastic material.

17. The braking system of claim 16, said plastic material having sufficient strength to prevent shearing when said pedal rod is subjected to a tensile force of approximately 1000 pounds.

* * * * *